Jan. 23, 1962 W. E. CONLEY 3,017,998
APPARATUS FOR SEPARATION OF SOLIDS FROM A LIQUID
Filed Dec. 12, 1958 2 Sheets-Sheet 1
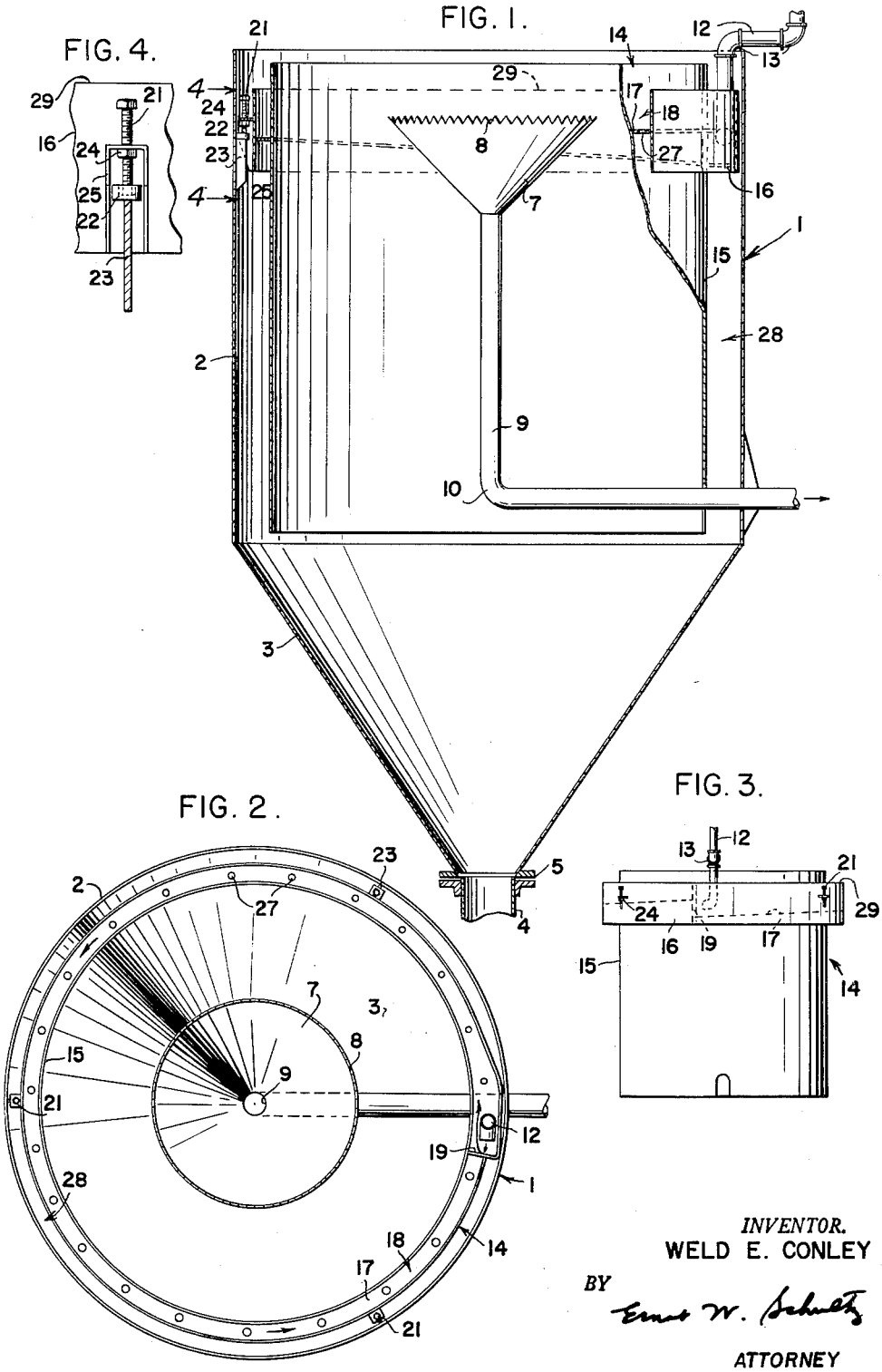
INVENTOR.
WELD E. CONLEY
BY
Ernest W. Schultz
ATTORNEY Jan. 23, 1962 W. E. CONLEY 3,017,998
APPARATUS FOR SEPARATION OF SOLIDS FROM A LIQUID
Filed Dec. 12, 1958 2 Sheets-Sheet 2

INVENTOR.
WELD E. CONLEY
BY *Ernst W. Schultz*
ATTORNEY

United States Patent Office 3,017,998
Patented Jan. 23, 1962

---

3,017,998
APPARATUS FOR SEPARATION OF SOLIDS FROM A LIQUID
Weld E. Conley, Wauwatosa, Wis., assignor to Chain Belt Company, Milwaukee, Wis., a corporation of Wisconsin
Filed Dec. 12, 1958, Ser. No. 780,093
7 Claims. (Cl. 210—519)

This invention relates to apparatus for the gravity-separation of suspended solids from a liquid and particularly the separation of slurries consisting of, for example, hydrolyzed coffee grounds and coffee hydrolyzate.

According to the invention, the separation tank is provided with a removable inner unit adapted to receive the slurry and introduce the same into the tank around the periphery thereof. The unit includes a channel having a series of ports opening downwardly into an annular chamber defined by the lower part of the unit and the side wall of the tank. The foam from the slurry and overflow of the slurry in the channel drains into the same chamber for introduction into the tank. The unit is removable for periodic cleaning of the tank and is readily adjustable so as to be level and at the height required with respect to the effluent trough centrally located within the tank.

A principal object of the invention is to provide a more efficient separation tank and which may be readily disassembled for cleaning.

Another object is to provide for the distribution of the influent around the periphery of the tank by means of a series of distribution ports for low and normal rates of flow and by the additional means of an overflow weir at greater or surcharge rates.

Another object is to provide a removable distribution unit for handling liquids and suspended solids with maximum efficiency at both extremely high and extremely low rates of flow.

The drawings furnished herewith illustrate the best mode of carrying out the invention as presently contemplated and set forth hereinafter.

Figure 5:
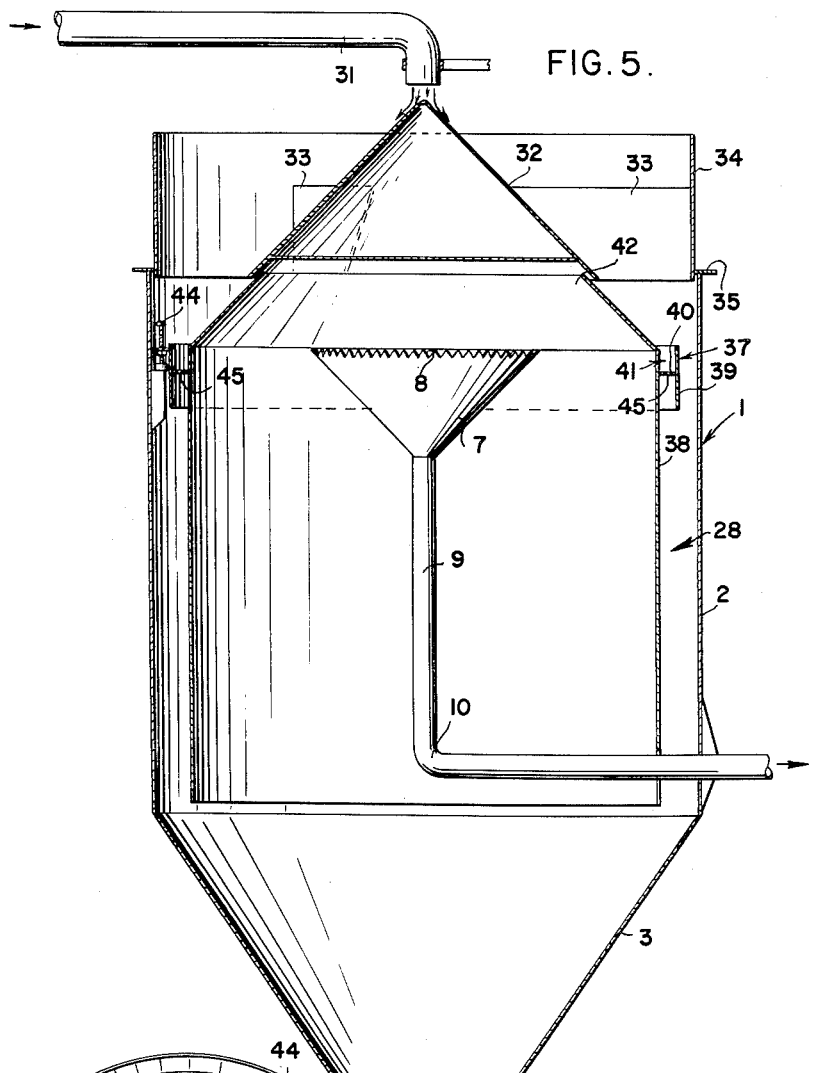
Figure 6:
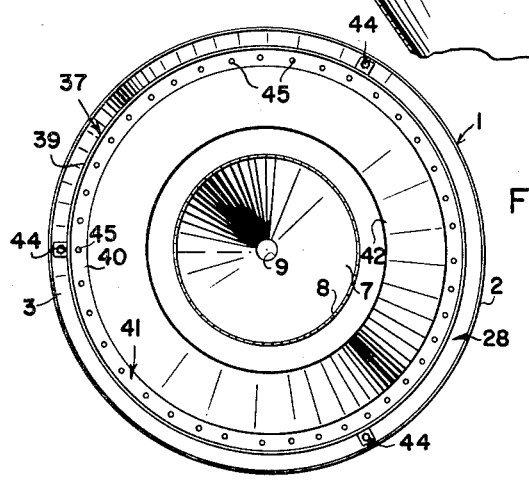

In the drawings:
FIGURE 1 is a central vertical section through the tank and showing the central effluent trough and the inner distribution unit broken away and sectioned;
FIG. 2 is a plan view of the tank and unit shown in FIGURE 1;
FIG. 3 is a reduced side elevation of the distribution unit as removed from the tank;
FIG. 4 is an enlarged section of one of the adjustment screws and is taken on line 4—4 of FIGURE 1;
FIG. 5 is a view similar to FIGURE 1 and showing an alternate form of the invention; and
FIG. 6 is a plan view of the alternate form of the invention shown in FIG. 5, with upper part removed.

The tank 1 shown in the drawings includes the cylindrical member 2 forming the side walls of the tank and the lower cone member 3 forming the bottom of the tank. The end of pipe 4 connected to the lower end of cone member 3 by the fitting 5 is normally closed by suitable means, not shown, and when opened provides for the withdrawal of the solids settling on the tank bottom and collecting in the cone member 3. Mechanical means, not shown, may also be provided for scraping the solids toward the lower end of the cone.

The effluent funnel 7 which is centrally disposed in tank 1 for the withdrawal of the clarified liquid is provided with a series of weir-notches 8 and is connected to the discharge pipe 9 which extends downwardly to the bend 10 and therefrom outwardly of the tank through the side wall 2.

As shown in FIGURE 1, the slurry to be separated is delivered to the tank 1 by the pipe 12 which includes the fittings 13 whereby the pipe may be moved out of the way for lowering the distribution unit 14 into the tank.

The unit 14 includes the inner cylinder 15 and the outer cylindrical member 16 which are joined by the web member 17 forming the floor of the channel 18 extending around the unit. The lower end of pipe 12 opens into the larger end of channel 18 in the direction of the partition 19 which defines the ends of the channel. The floor member 17 slopes upwardly from the larger, deeper end of the channel on one side of partition 19 and the shallow end of the channel is terminated by the other side of the partition.

Unit 14 is supported within tank 1 by the screws 21 having lower pads 22 resting on the three projecting brackets 23 fixed to the inside of wall 2 of the tank. Each screw 21 is threaded in a nut 24 welded within a bracket 25 fixed to the outside of the cylindrical member 16. The screws 21 are turnable to adjust the height of unit 14 within limits with respect to effluent funnel 7 and to adjust the level of the unit as will be described.

The series of ports 27 in floor member 17 provides for the distribution of the raw flow or slurry throughout the upper region of the annular chamber 28 as defined by or between the side wall 2 of tank 1 and the lower skirt portion of the cylinder 15.

In the operation of the unit for the separation of the slurry delivered by pipe 12 to channel 18, the slurry in the channel is provided with a slight head or elevation above the liquid level within the tank so that the slurry discharges at substantially equal rates through the several ports 27 into chamber 28. The flow through the chamber equalizes in moving downwardly so that the slurry enters the tank from the lower end of the chamber with a minimum of turbulence and the suspended solids readily settle out while the liquid readily moves upwardly toward funnel 7 for discharge.

The upper edge 29 of the outer member 16 is lower than the tops of tank 1 and cylinder 15 and determines the maximum head or elevation referred to. This head or elevation may be adjusted within limits by turning screw 21 and raising or lowering the unit without otherwise affecting its operation.

Adjustment screws 21 also allow the unit to be carefully adjusted as to the level of edge 29 of member 16 so that if the tank is to be operated at an excessively high rate for short periods, the edge forms a weir and the slurry is then allowed to overflow the channel 18 into chamber 28 in addition to the flow which also enters the chamber through ports 27. The present invention also eliminates the difficulties normally encountered where the suspended solids and liquid form a foam which ordinarily overflows the tank. The foam which develops in channel 18 overflows or may be periodically scraped over the edge 29 of member 16 and into the top of chamber 28 where it is eventually carried with the flow into the tank.

The alternative embodiment of the invention shown in

FIGS. 5 and 6 of the drawings is generally intended for a thicker slurry which is delivered to tank 1 by the pipe 31 opening downwardly over the cone 32.

Cone 32 is supported by the webs 33 extending radially inwardly from the adjustment ring 34 having an outer flange 35 resting on the top edge of the side wall 2 of tank 1.

The distribution unit 37 is similar to unit 14 and includes the inner cylinder 38 and outer ring 39 joined by the member 40 forming the floor of the channel 41. The frusto-conical cone 42 extending upwardly and inwardly from the upper edge of cylinder 38 has an upper end fitting beneath the lower edge of cone 32 so that the slurry from pipe 31 flows downwardly over the surfaces of cones 32 and 42 into channel 41.

Ring 34 is smaller than the upper end of the tank and cone 32 is sufficiently larger than cone 42 so that cone 32 can be adjusted or centered beneath pipe 31 for distribution of the slurry over the cones and throughout the channel which may be of uniform depth. The adjustment referred to is allowed by the sliding of flange 35 on the top edge of the tank wall 2 and is independent of the separate adjustment of the unit 37 by the three supporting screws 44 in a manner similar to that described in connection with the embodiment shown in FIGS. 1–4.

The vertical and levelling adjustment of unit 37 provides the same advantages as described and for the slurry to flow only through the ports 45 in floor 40 or also over the edge of member 39 into the distribution chamber 28.

The vertical adjustment of the unit 14 shown in FIGS. 1–3 also determines the depth of the flow in channel 18. That is, with the unit raised so that the floor 17 at the end of the channel is just below the liquid level maintained within the tank by weir-notches 8, the flow will have the least depth and the greatest velocity at a given rate of flow. With the unit 14 lowered so that the weir 29 is (necessarily) just above the liquid level referred to, the flow in channel 18 will have the greatest depth. At the given rate of flow referred to, the flow in the channel will then have the least velocity.

The velocity range may or may not be critical for a given slurry. The velocity should be sufficient to distribute the solids around the tank, but as low as possible otherwise so that the ports discharge efficiently and uniformly around the tank.

The present invention provides apparatus particularly for use in food processing where different substances are to be separated from time to time and also where cleaning of the tank as facilitated by removal of unit 14 is frequent and necessary.

Various modes of carrying out the invention are contemplated as within the scope of the following claims particularly pointing out and distinctly claiming the subject matter which is regarded as the invention.

I claim:

1. Apparatus for the gravity-separation of suspended material from a liquid, comprising a round tank having side walls and a conical bottom provided with a lower central outlet for material settling and collected on the tank bottom, a pipe extending from the center of the tank for the withdrawal and discharge of the liquid from the tank, spaced brackets extending inwardly from the wall of the tank near the top thereof, and a unitary assembly for installation within the tank and support on said brackets comprising concentric cylinders having open upper and lower ends and an intermediate sloping member defining an upper, annular open channel, one end of the channel being relatively deep and adapted to receive the raw flow of liquid and suspended material and said member having ports directing the flow downwardly therefrom, the lower part of the inner cylinder and the side walls of the tank defining a chamber to receive the flow through said ports, and the upper part of the outer cylinder being spaced from the side walls of the tank and forming a weir for distributing the liquid overflowing the channel into said chamber.

2. In combination with a tank for the gravity-separation of suspended material from a liquid delivered to the tank at normal rates and at surcharge rates for limited periods, the flow being introduced into the lower part of the tank from an annular chamber extending around the periphery thereof, said tank having bottom and side walls and separate means for the withdrawal and discharge of the separated material and the clarified liquid; a unitary assembly supported within the tank and spaced from the walls thereof comprising an upper, annular channel having adjacent ends at one side of the tank and a lower cylindrical skirt depending from said channel, one end of said channel being larger and adapted to receive the raw flow, the side-wall of the tank and said skirt being spaced to define said chamber, said channel including a floor having a series of ports opening into the upper part of said chamber for normal introduction of the flow from the channel into the upper part of the chamber, and the outer side of said channel being spaced from the side wall of the tank and forming a weir allowing the surcharge to overflow the channel into the upper part of the chamber.

3. Apparatus for the gravity-separation of suspended material from a liquid, comprising a tank having side and bottom walls, means for withdrawing the separated solids and the clarified liquid from the tank, a unitary inner assembly mounted inside the tank and including an upper, annular channel adapted to receive the liquid and suspended solids, a lower cylindrical skirt, means supporting the unit for vertical adjustment within the tank and with the unit spaced from the walls of the tank to form an annular chamber beneath the channel and opening downwardly into the tank and means for distributing the incoming flow throughout the length of the annular channel, said channel having an outer over-flow weir and lower ports both being disposed to discharge into said chamber.

4. The invention of claim 3 wherein the distributing means includes a conical, upright member having its smaller end disposed in the path of the incoming flow and its larger, lower end disposed to direct the flow into and throughout the channel.

5. Apparatus for the gravity-separation of suspended material from a liquid discharging downwardly from a pipe, comprising a tank having side and bottom walls, an upper conical member supported on the top of said side walls of the tank and laterally adjustable so as to be directly beneath said pipe, means for withdrawing the separated solids and the clarified liquid from the tank, a unitary inner assembly mounted inside the tank and including an upper, annular channel disposed to receive the liquid flowing downwardly over said conical member and a lower cylindrical skirt attached to said channel, and means supporting the unit within the tank and with the unit spaced from the walls thereof to form an annular chamber beneath the channel and opening downwardly into the tank, the outer rim of said channel providing an over-flow weir and the bottom of said channel having said weir and ports being disposed to discharge into said chamber and said support means being adjustable for both the adjustment of the effective height of said ports and the level of said weir and separately of the adjustment of said conical member.

6. The invention as defined in claim 5 wherein said unit includes a frusto-conical member having its smaller end disposed upwardly and movable within limits within the larger lower end of said conical member and its lower edge joined to the inner rim of said channel and movable therewith.

7. Apparatus for the gravity-separation of suspended material from a liquid, comprising a tank having side and bottom walls, means for withdrawing the separated solids and the clarified liquid from the tank and including overflow means maintaining a given liquid level within the tank, a unitary inner assembly mounted inside the tank and including an upper, annular channel adapted to receive the liquid and suspended solids, a lower cylindrical skirt, and means supporting the unit within the tank and spaced from the walls thereof to form an annular chamber outside of and beneath the channel and opening downwardly into the tank, said channel having an outer over-flow weir and lower ports both being disposed to discharge into said chamber, said ports providing the regular distribution of the flow into the upper part of said chamber and said weir providing the distribution of the surcharge into said chamber and said support means being separately adjustable for both the adjustment of the effective height of said ports and the adjustment of the level and height of said weir respecting said given liquid level.

References Cited in the file of this patent

UNITED STATES PATENTS

| | | |
|---|---|---|
| 2,118,157 | Camp | May 24, 1938 |
| 2,565,343 | Benham | Aug. 21, 1951 |

FOREIGN PATENTS

| | | |
|---|---|---|
| 572,864 | Germany | Mar. 24, 1933 |